(12) United States Patent
Tsai

(10) Patent No.: US 7,520,766 B2
(45) Date of Patent: Apr. 21, 2009

(54) FIXING DEVICE FOR SUBSCRIBER IDENTIFICATION MODULE CARD

(75) Inventor: Kun-Shiang Tsai, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 12/068,197

(22) Filed: Feb. 4, 2008

(65) Prior Publication Data

US 2008/0132120 A1   Jun. 5, 2008

(30) Foreign Application Priority Data

Feb. 6, 2007   (TW) ............................. 96104320 A

(51) Int. Cl.
*H01R 13/62* (2006.01)
(52) U.S. Cl. ..................................... 439/159
(58) Field of Classification Search ................. 439/159, 439/152, 155, 630
See application file for complete search history.

(56) References Cited

U.S. PATENT DOCUMENTS

| | | | | |
|---|---|---|---|---|
| 4,952,161 | A * | 8/1990 | Komatsu | 439/155 |
| 5,655,917 | A * | 8/1997 | Kaneshige et al. | 439/155 |
| 6,712,627 | B2 * | 3/2004 | Murnaghan et al. | 439/159 |
| 6,908,322 | B1 * | 6/2005 | Bricaud et al. | 439/152 |
| 6,957,969 | B2 * | 10/2005 | Kodera et al. | 439/152 |
| 7,011,537 | B1 * | 3/2006 | Wu | 439/159 |
| 7,066,748 | B2 * | 6/2006 | Bricaud et al. | 439/159 |
| 7,081,020 | B1 * | 7/2006 | Lee | 439/630 |
| 7,101,207 | B1 * | 9/2006 | Chi-Te | 439/188 |
| 7,198,497 | B1 * | 4/2007 | Lai et al. | 439/159 |
| 7,229,300 | B2 * | 6/2007 | Lai et al. | 439/159 |
| 7,229,311 | B2 * | 6/2007 | Nagano | 439/500 |
| 7,303,413 | B1 * | 12/2007 | Lai et al. | 439/152 |
| 7,351,081 | B1 * | 4/2008 | Lai | 439/159 |
| 7,361,037 | B2 * | 4/2008 | Kanazawa | 439/159 |
| 7,371,088 | B2 * | 5/2008 | Chen et al. | 439/159 |
| 7,396,243 | B1 * | 7/2008 | Lai | 439/159 |
| 2004/0009691 | A1 * | 1/2004 | Chang | 439/159 |
| 2004/0259401 | A1 * | 12/2004 | Wu | 439/159 |
| 2005/0037648 | A1 * | 2/2005 | Kodera et al. | 439/152 |
| 2005/0074995 | A1 * | 4/2005 | Kimura et al. | 439/159 |
| 2005/0196991 | A1 * | 9/2005 | Hautvast | 439/159 |
| 2006/0234536 | A1 * | 10/2006 | Kuan et al. | 439/159 |
| 2007/0087600 | A1 * | 4/2007 | Chen et al. | 439/159 |
| 2007/0105446 | A1 * | 5/2007 | Lai et al. | 439/630 |
| 2007/0207651 | A1 * | 9/2007 | Kanazawa | 439/159 |
| 2007/0243736 | A1 * | 10/2007 | Maruyama | 439/159 |

* cited by examiner

*Primary Examiner*—T C Patel
*Assistant Examiner*—Vladimir Imas
(74) *Attorney, Agent, or Firm*—Birch, Stewart, Kolasch & Birch, LLP

(57) ABSTRACT

A fixing device for an electronic card is disposed at the inside of the housing of a portable electronic product, and at least includes a sliding element, an elastic element and a blocking element. The sliding element pushes against the electronic card, and when the front end of the sliding element enters or is eject from the portable electronic product through a setting opening, it drives the electronic card to enter or be eject from the portable electronic product through the setting opening. The elastic element pushes the sliding element by its elastic action, and makes the front end of sliding element exposed outside the housing through the setting opening. The blocking element is adjacent to the setting opening. When the front end of the sliding element enters into the portable electronic product through the setting opening, the blocking element can push against the front end of the sliding element to prevent the sliding element from being exposed outside the housing because of the action of the elastic element.

23 Claims, 6 Drawing Sheets

FIXING DEVICE FOR SUBSCRIBER IDENTIFICATION MODULE CARD

BACKGROUND OF THE INVENTION

1. Field of the Invention

The invention relates to a fixing device for an electronic card and, more particularly, to a fixing device for an electronic card, which is applied to a portable electronic product.

2. Description of the Related Art

Along with the rapid development of the electronic industry, a plurality of electronic products continuously weed through the old to bring forth the new. Especially, in the recent years, functions of various portable electronic products also become diverse day after day, and the portable electronic products are needful in the life of consumers. In numerous portable electronic products such as a mobile phone, a personal digital assistant (PDA) and a notebook computer, the mobile phone is the most common portable electronic product.

To bring the personal communication function of the mobile phone into play, a subscriber identification module (SIM) card disposed in the mobile phone acts as an important role. The SIM card is a plastic card and has an integrated circuit (IC) chip to execute functions of recording the basic information of the personal number in the mobile phone, the contact list, the foundation of the user-to-user communication, the foundation for calculating the charge, and so on.

To effectively fix the above electronic card and to enable the above electronic card to effectively be electrically connected with the inner circuit of the portable electronic produce or to transmit data with the inner circuit of the portable electronic produce, the fixing device for an electronic card is very important. Please refer to FIG. 1A, and FIG. 1A is a schematic diagram showing the fixing device for a SIM card of a conventional mobile phone, and the SIM card 2 is provided in a recess 10 under the battery which is located at the back of a mobile phone. As shown in the FIG. 1A, a SIM card connector 11 is disposed in the recess 10, and includes a plurality of circuit terminals 111 and a plurality of fixing elastomers 112. The circuit terminals 111 are used as passages of the electrical connection between the SIM card 2 and the inner circuit of the mobile phone. The fixing elastomers 112 are used for fixing the inserted SIM card 2 to prevent the SIM card 2 from sliding and ensuring that the SIM card 2 can tightly contact with the circuit terminals 111 on the SIM card connector 11. However, the conventional technology has problems that the SIM card is exposed and the space for inserting the SIM card is limited, and therefore, when the battery or the SIM card is drawn out and changed, the abrasion of the SIM card is easy to be caused by the inappropriate force application.

To reduce the generation of the above problems and make the SIM card more easily installed and taken out, at present, the industry is gradually inclined to utilize the push-push type of the fixing device for an electronic card. Please refer to FIG. 2A, and FIG. 2A is a schematic diagram showing a conventional mobile phone which has a push-push type of fixing device for a SIM card. The fixing device for a SIM card 12 mostly includes a setting opening 121, an ejecting element 122 and a locking element 124.

The setting opening 121 is a passage for inserting the SIM card. The ejecting element 122 is disposed at the end which is opposite to the setting opening, and has an elastic structure for pushing against one end of the SIM card and applying elastic force. The locking element 124 is adjacent to the setting opening 121 and can be moved up and down by force, and the top surface of the locking element 124 further has a flange 124a.

Please refer to FIG. 2B. When the SIM card 2 is inserted into the fixing device 12 through the setting opening 121, the bottom surface of the SIM card can press the locking element 124 downward, and one end of the SIM card 2 can push against the elastic structure of the ejecting element 122 to make the elastic structure of the ejecting element 122 deformed inward. When the SIM card completely enters into the fixing device 12, the locking element 124 can be separated from the restriction of the bottom surface of the SIM card further to move upward, and the flange 124a of the locking element 124 can push against the other end of the SIM card 2, thereby preventing the SIM card 2 from being eject. Therefore, the ejecting element 122 and the locking element 124 can clamp the two ends of the SIM card 2 to enable the SIM card to be effectively fixed to a correct position.

In addition, as shown in FIG. 2B, the fixing device 12 further has two retaining elements 126 which are disposed at the upper edge of the fixing device 12 and are used for restricting the up and down movement of the SIM card, and the SIM card is effectively fixed in the fixing device 12. Next, when the user wants to withdraw the SIM card, he only needs to move the locking member 124 to make the other end of the SIM card separated from the push of the flange 124a, and then the SIM card can be pushed out of the fixing device by the outward elastic force of the ejecting element 122, and at this time, the user can easily take out the SIM card.

In the fixing device for the SIM card 12, the setting opening 121, the ejecting element 122, the retaining element 126 and the locking element 124 are soldered on the printed circuit board (PCB). Therefore, the device itself occupies a certain area of the circuit board.

However, the development trend of the mobile phone is to be light, thin, short and small, and although the above fixing device having a push-push function can effectively fix the SIM card and has the convenience of inserting or ejecting the card, the occupied space is larger, and the whole structural design is limited by the space factor, so that the bottleneck of the application of the space occurs.

BRIEF SUMMARY OF THE INVENTION

The invention provides a fixing device for an electronic card, and the fastening device for an electronic card can be disposed at the inside of the housing of a portable electronic product and is used for installing and fixing an electronic card to the portable electronic product through a setting opening on the housing or for ejecting the electronic card from the setting opening.

The fixing device for an electronic card includes a sliding element, an elastic element and a blocking element. The sliding element is located at the inside of the housing and against the electronic card. When the front end of the sliding element enters or is ejected from a setting opening of the portable electronic product, it drives the electronic card to be ejected from the setting opening of the portable electronic product or enters into the portable electronic product with the electronic card.

The elastic element connects the housing and the sliding element. The elastic element can push the sliding element by its elasticity to expose the front end of the sliding element outside the housing through the setting opening. The blocking element is provided at the inside of the housing and is adjacent to the setting opening. When the front end of the sliding element enters into the portable electronic product through the setting opening, the blocking element pushes the front end of the sliding element to prevent the sliding element from exposing outside the housing because of the elasticity of the elastic element. When the sliding element is pressed to release from the blocking element. The elastic element pushes the sliding element to eject the electronic card from the electronic portable product through the setting opening.

The embodiment of the invention further includes a limiting element which is disposed at the inside of the housing and is applied to limit the sliding direction of the sliding element.

These and other features, aspects, and advantages of the present invention will become better understood with regard to the following description, appended claims, and accompanying drawings.

DETAILED DESCRIPTION OF THE EMBODIMENTS

Figure 1:
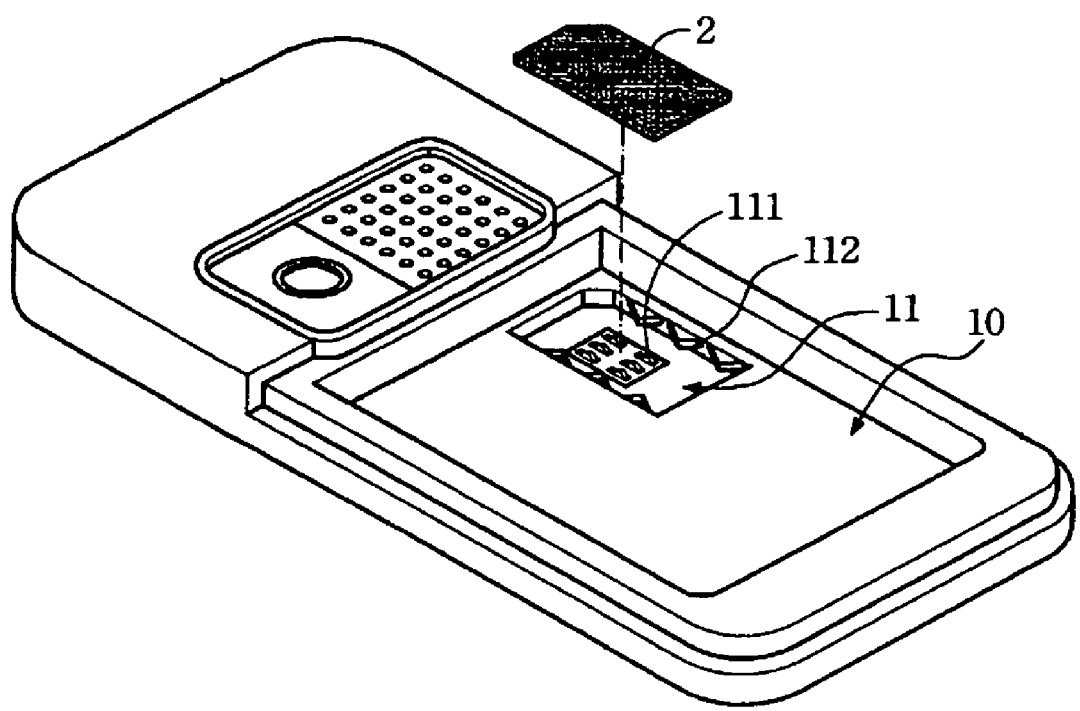
FIG. 1 is a schematic diagram showing the fixing device for a subscriber identification module (SIM) card of a conventional mobile phone.
Figure 2A:
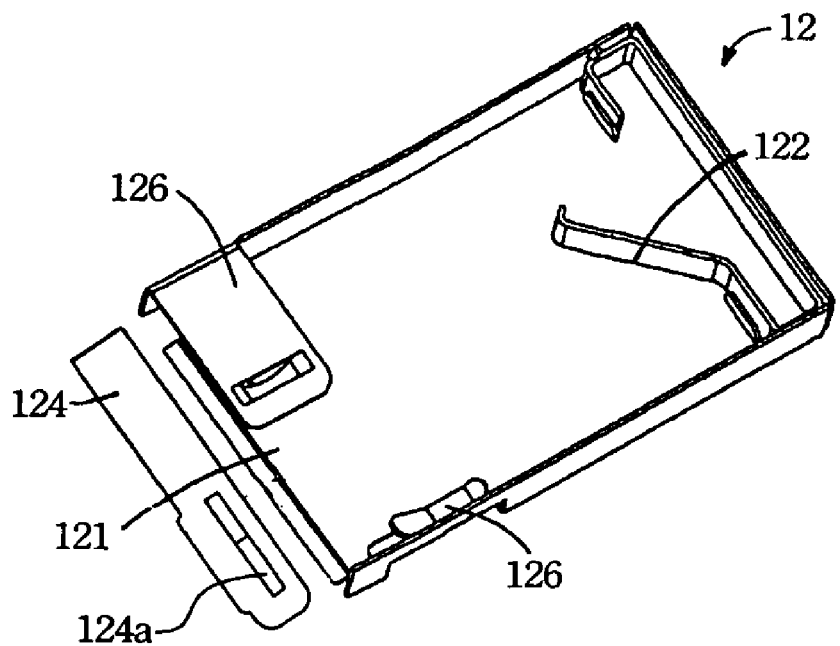
FIG. 2A and FIG. 2B are schematic diagrams showing a conventional push-push type of fixing device for a SIM card.
Figure 2B:
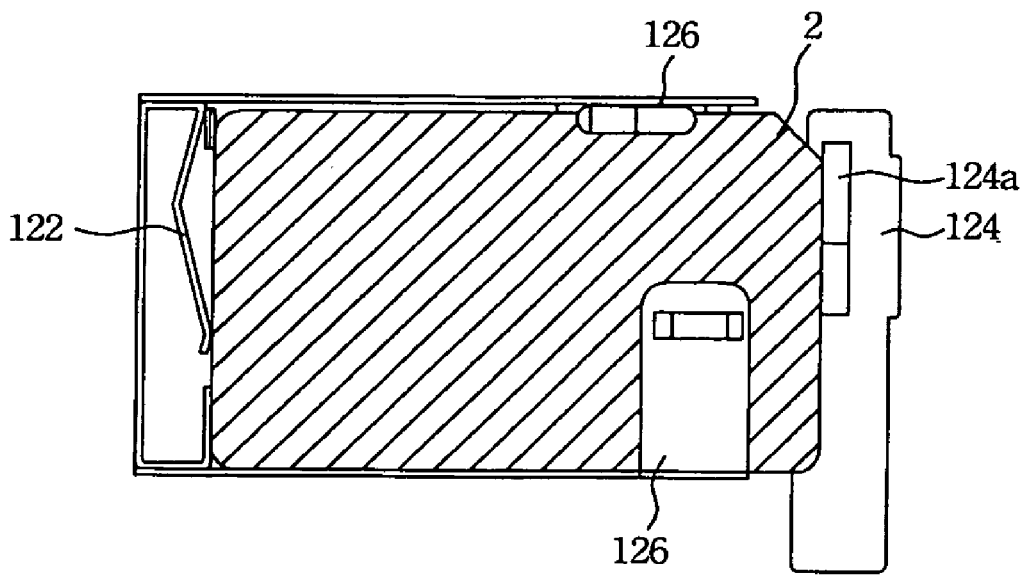
Figure 3:
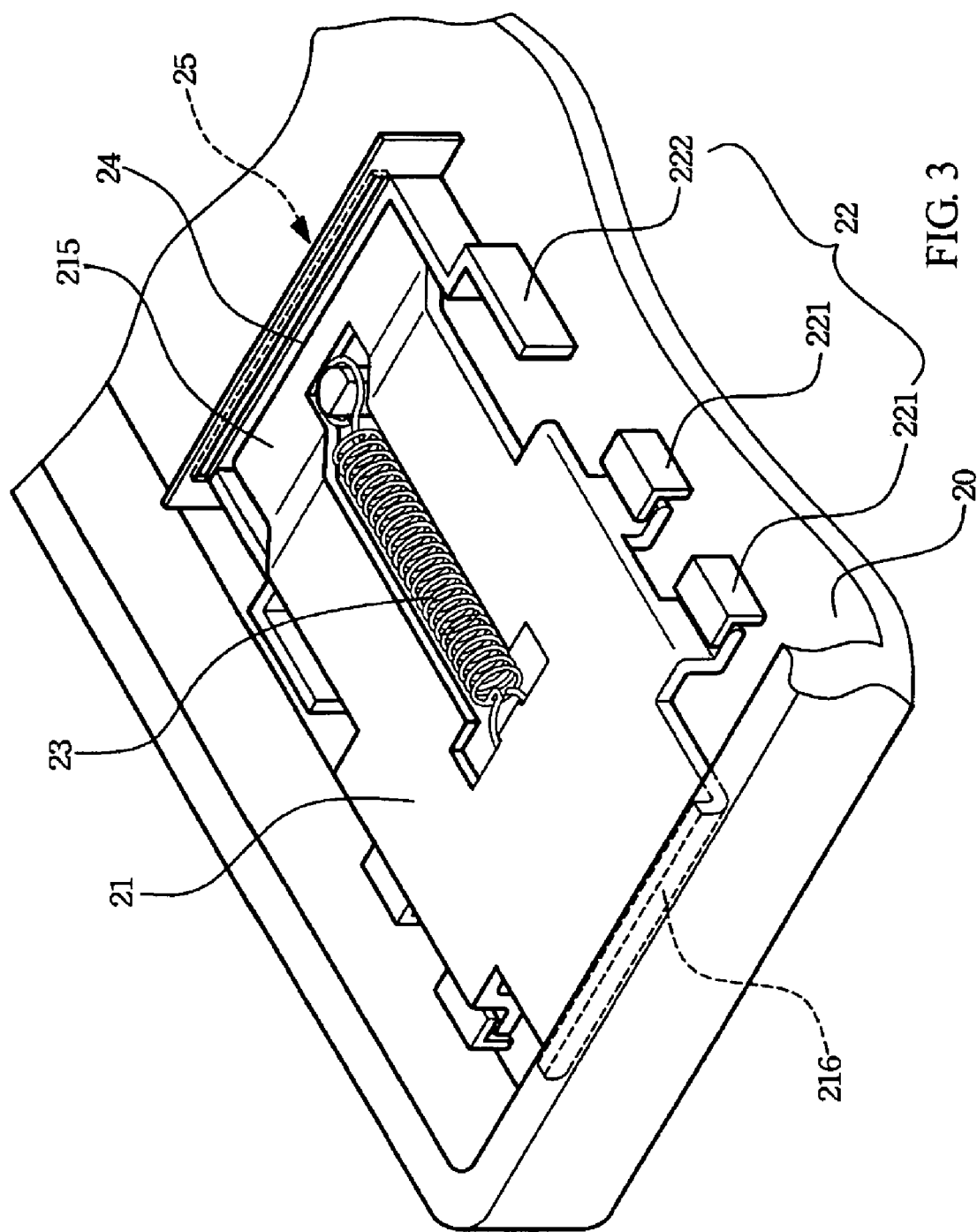
FIG. 3 is a schematic diagram showing a fixing device for an electronic card of the invention.

FIG. 3 is an assembly diagram showing a fixing device for an electronic card of the invention. The fixing device for an electronic card may be disposed at the inside of the housing of any portable electronic product, and used for installing and fixing an electronic card (please refer to FIG. 5) to the portable electronic product or ejecting the electronic card through a setting opening 25 of the housing. A circuit board is provided in the portable electronic product, and the electronic card contacts with connecting terminals on the circuit board to be electrically connected to the circuit board. The portable electronic product may be, a mobile phone, a personal digital assistant (PDA) or a notebook computer, and the electronic card can be a subscriber identification module (SIM) card or a memory card.

In a preferred embodiment of the invention, which is shown in the drawings, main components of the fixing device for an electronic device include a sliding element 21, an elastic element 23 and a blocking element 24. The sliding element 21 is disposed against the electronic card, and the movement of the sliding element 21 drives the electronic card to be ejected from the portable electronic product through the setting opening 25, or enter the portable electronic product with the sliding element 21. The elastic element 23 is disposed at the inside of the housing. One end of the elastic element 23 is connected to the sliding element 21, and the other end of the elastic element 23 is connected to the structure at the inside of the housing. The elastic element 23 pushes the sliding element 21 by its elasticity to expose the front end 215 of the sliding element 21 outside the housing through the setting opening 25.

The blocking element 24 is disposed at the inside of the housing and is adjacent to the setting opening 25. When the front end 215 of the sliding element 21 enters into the portable electronic product through the setting opening 25, the blocking element 24 is against the front end 215 of the sliding element 21 to prevent the sliding element 21 from exposing outside the housing because of the elasticity of the elastic element 23 and make the sliding element 21 securely fastened in the fixing device for an electronic card.

According to the above preferred embodiment, a limiting element 22 is disposed at the inside of the housing 20 to limit the sliding direction of the sliding element 21.

Figure 4:
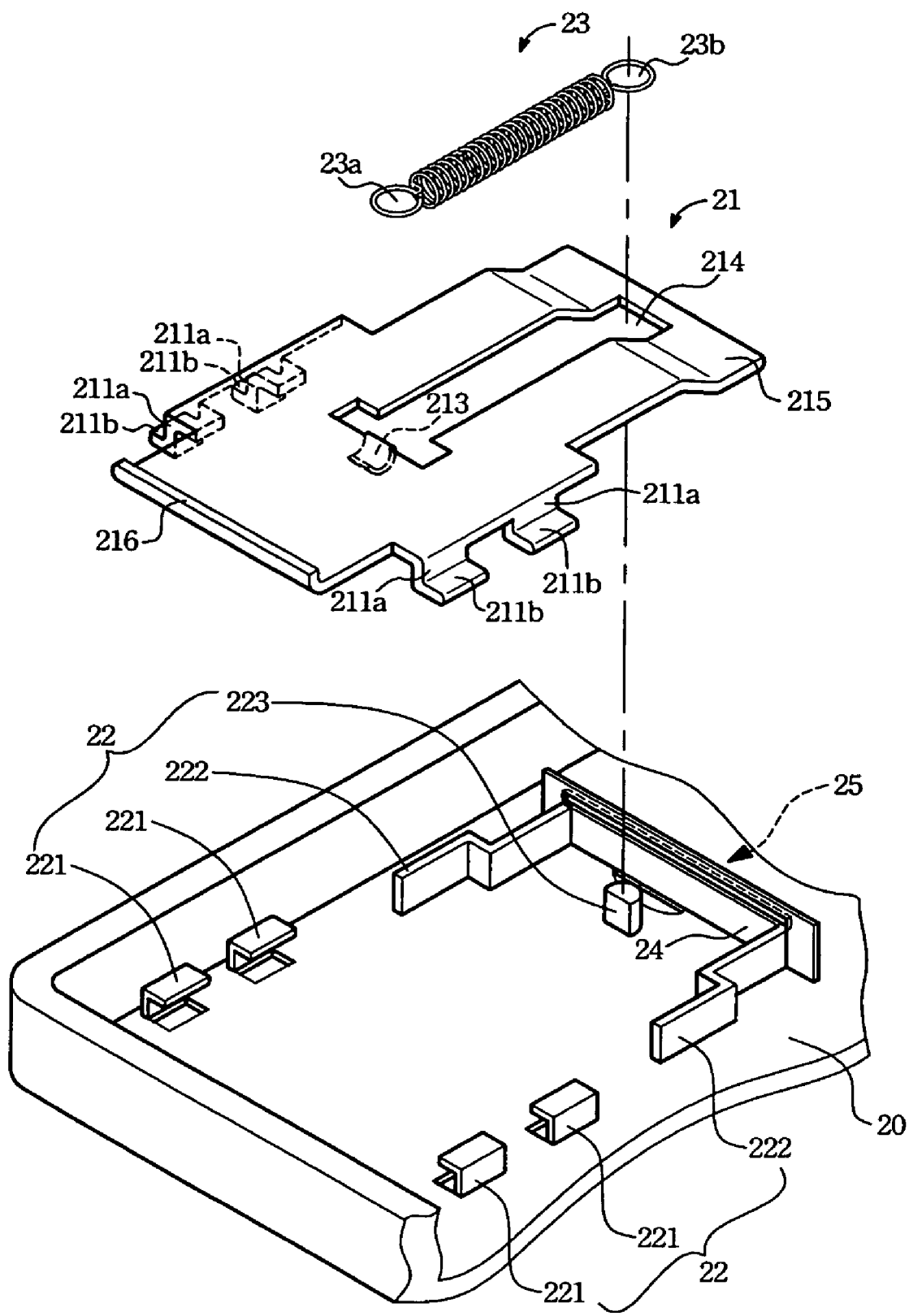
FIG. 4 is an exploded diagram showing a fixing device for an electronic card of the invention.

Next, please refer to FIG. 4 which is an exploded diagram showing a fixing device for an electronic card of the invention, and structural features of each component is described with FIG. 3 in detail. As shown in drawings, the sliding element 21 is a rectangle sliding sheet which at least includes two upright plates 211a, a overhead hook 213, a long groove 214, a bent front end 215 and a bent back end 216.

The two upright plates 211a stand on the two long sides of the sliding sheet, and the top of each plate 211a has a bent part 211b. The bent parts 211b are bent toward the outside of the sliding sheet, so that the plates 211a and the bent parts 211b form an L shape. The plates 211a and the bent parts 211b on the two long sides of the sliding sheet are mutually symmetrical.

The long groove 214 is disposed in the sliding sheet and used to accommodate the elastic element 23. The protrudent overhead hook 213 extends from one side of the long groove 214, and the overhead hook 213 is connected to the first end 23a of the elastic element 23, and the second end 23b of the elastic element 23 is connected to one protrudent pillar 223 provided at the inside of the housing 20. Therefore, the sliding element 21 is pushed by the elasticity of the elastic element 23.

When the electronic card enters through the setting opening 25, the electronic card will push the bent back end 216 of the rectangle sliding sheet and drive the sliding sheet 21 to enter the portable electronic product along with the electronic card. At this time, the elastic element 23 is in a stretched state. That is, when the sliding sheet 21 enters into the portable electronic product, the resilience of the elastic element 23 is capable of making the sliding sheet 21 slide to be exposed outside the housing.

Therefore, when the sliding sheet 21 enters into the portable electronic product, the downward bent structure of the bent front end 215 is used to prevent the sliding sheet 21 from sliding out. While the bent front end 215 of the sliding sheet 21 pushes the blocking element 24, the bent back end 216 is against the inside of the housing, thereby the position of the sliding sheet 21 is secured.

Please refer to FIG. 4, and the limiting element 22 of the invention is formed or disposed at the top surface within the housing 20 and includes two guiding plates 221 and a restricting plate 222.

The guiding plates 221 are located at two sides of the sliding sheet, respectively, and correspond with the bent parts 211b of the sliding sheet. In the embodiment, the guiding plates 221 have an L type structure alike the bent parts 211b, but the direction of the L type structure of the guiding plates 221 is opposite to the direction of the L type structure of the bent parts 211b. That is, when the sliding element 21 is assembled above the limiting element 22, the bent parts 211b are restricted between the guiding plates 221 and the inner surface of the housing 20 to make the sliding element 21 slide back and forth between the guiding plates 221.

In the preferred embodiment, each of the two long sides of the sliding element 21 has two upright plates 211a (and the bent parts 211b formed at the top of the plates 211a), and the upper surface of the inside 20 of the housing has four guiding plates 221 which are disposed correspondingly to the bent parts 211b of the sliding element 21.

However, If the sliding element 21 excessively slides back and forth between the guiding plates 221, the sliding sheet 21 may be ejected from the setting opening 25. Therefore, the restricting plate 222 is disposed adjacent to the setting opening 25 for preventing the sliding sheet 21 from sliding out the setting opening 25.

In the preferred embodiment, the two restricting plates 222 of the limiting elements 22 are more close to the setting opening 25 than the guiding plates 221. The distance between the two restricting plates 222 is smaller than the distance between the two guiding plates 221. Therefore, when the sliding sheet 21 slides along the guiding plates 221 for a certain distance, the restricting plates 222 will stop the bent parts 211b of the sliding sheet 21 to prevent the sliding sheet 21 from being ejected from the setting opening 25.

Figure 5:
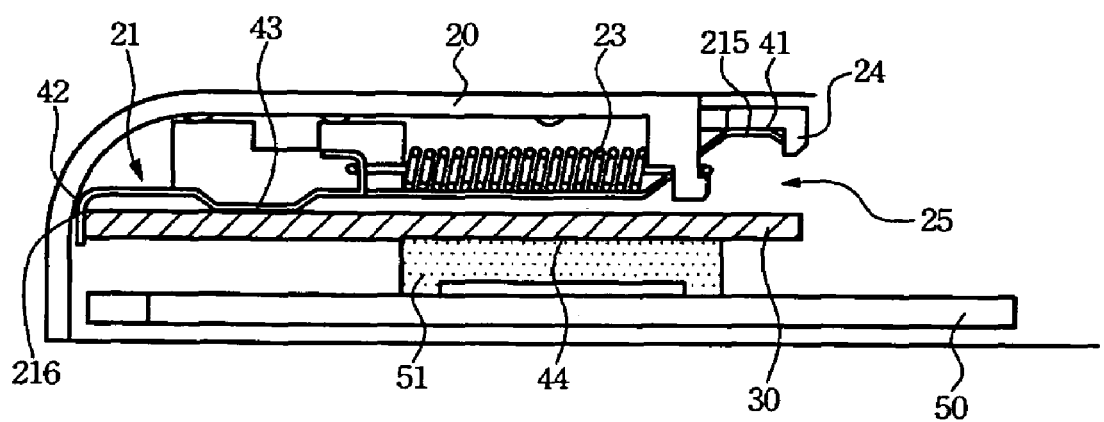
FIG. 5 is a schematic diagram showing a fixing device for an electronic card of the invention, which is applied in a mobile phone, and an electronic card which is located in the fixing device for an electronic card.

FIG. 5 is a cross-section diagram showing the fixing device for an electronic card is applied to a mobile phone. As shown in the drawings, the fixing device for an electronic card is disposed at the inside of the housing 20 of the mobile phone. When the user inserts the SIM card 30 into the mobile phone through the setting opening 25, the front end of the SIM card 30 pushes the bent back end 216 of the sliding sheet 21 until the bent back end 216 is against inner surface of the housing 20. Meanwhile, the bent front end 215 of the sliding sheet 21 enters into the inside of the blocking element 24.

At this time, the elastic element 23 is in the stretched state, so that the resilience of the elastic element 23 forces the sliding sheet 21 to be ejected outward. Because the bent front end 215 of the sliding element 21 precisely enters into the inside of the blocking element 24, the blocking element 24 will stop the sliding element 21 thereby fastening the SIM card 30 inserted in the housing 20.

When the SIM card 30 is installed in the fixing device of the invention, the front end 215 of the sliding sheet 21 pushes the blocking element 24 to form a first restricting surface 41. The front end of the SIM card contacts with the bent back end 216 of the sliding sheet 21 and pushes the inside of the housing 20 to form a second restricting surface 42. A connector 51 on the circuit board 50 in the portable electronic product and the sliding element 21 clamp the SIM card 30 from the top and the bottom, respectively, to form a third restricting surface 43 and a fourth restricting surface 44. In addition, the restricting plates 222 in FIG. 4 may form another restricting surface by pressing the top of the SIM card 30, and when the battery is installed in the portable electronic product, the vertical surface of the battery may be a restricting surface against the SIM card.

Therefore, the four restricting surface 41, 42, 43 and 44 can effectively restrict and fasten the SIM card 30, and secure that the SIM card 30 effectively contact and electrically connected with connecting terminals of the connector 51.

Figure 6A:
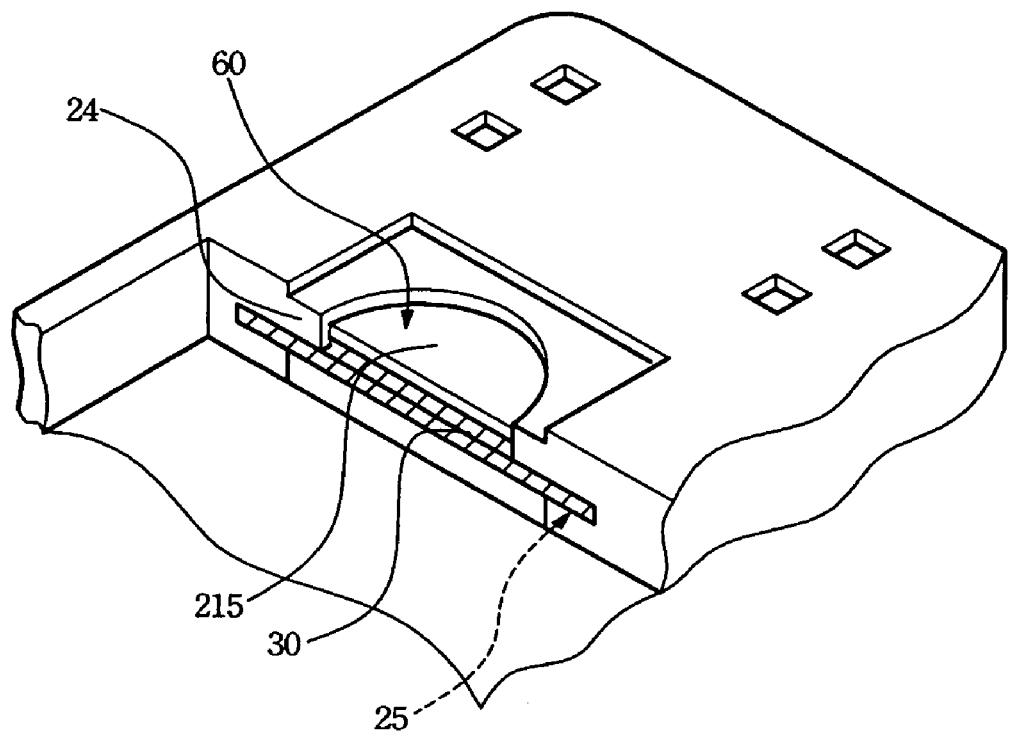
FIG. 6A is an outside view drawing showing the back of a mobile phone when an electronic card is provided in a fixing device for an electronic card of the invention.

Please refer to FIG. 6A, and FIG. 6A is an outside view drawing showing a SIM card 30 which is inserted to a fixing device for an electronic card. As shown in the FIG. 6A, the SIM card 30 is disposed in the fixing device for an electronic card. In addition, the housing of the mobile phone has an opening 60 which is used for exposing the bent front end 215 of the sliding element 21. In the preferred embodiment, the setting opening 25 is adjacent to the battery container of the mobile phone. Therefore, when the SIM card 30 is inserted to the fixing card for an electronic card, and the battery is also assembled, the battery can cooperate with one end of the SIM card 30 to restrict the position of the SIM card 30.

Figure 6B:
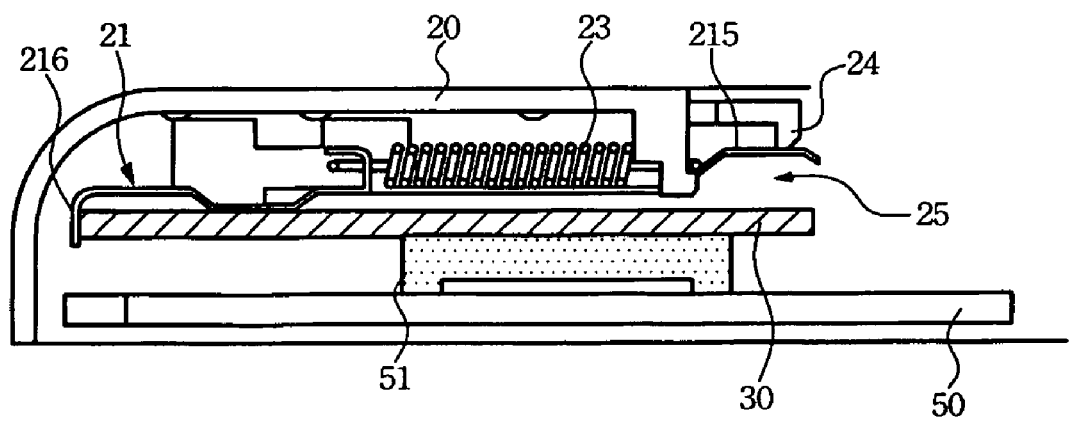
FIG. 6B is a schematic diagram showing that an electronic card is ejected from a fixing device for an electronic card of the invention.

FIG. 6B is a schematic diagram showing an SIM card 30 which is ejected. When the sliding sheet 21 is located at the inside of the housing, the sliding element 21 against the blocking element 24 may be pressed downward through the opening 60 to release the front end 215 of the sliding element 21 from the blocking element 24. At this time, the sliding element 21 is ejected outside the setting opening 25 by the resilience of the elastic element 23.

The front end of the SIM card 30 contacts with the bent back end 216 of the sliding element 21. when the sliding element 21 is ejected from the setting opening 25, the sliding element 21 will drive the SIM card 30 to be ejecting together. Then, the user can easily take out the SIM card 30 to unloading the SIM card 30.

Furthermore, the user may insert the electronic card to push the sliding element or directly push the bent front end 215 of the sliding element 21. That is, when the bent front end 215 of the sliding sheet 21 is ejected outside the housing, the user may directly push the bent front end 215 of the sliding element 21 toward the inside of the housing and is against the blocking element 24 again. At this time, the elastic element 23 restores the stretched state.

To sum up, the embodiment of the invention has the following advantages.

First, there are simple elements disposed at the embodiment, so the inner space of the housing, can be reduced.

Second, since the sliding element and the electronic card may move by elasticity of the elastic element in the embodiment to enter or be ejecting from the portable electronic product. The damage caused by the inappropriate force applied by the user will be reduced.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A fixing device for an electronic card, which is provided in the inside of the housing of a portable electronic product and is used for installing and fastening an electronic card at the portable electronic product through a setting opening on the housing or for ejecting the electronic card from the setting opening, the fixing device comprises:

a sliding element which is movably provided at the inside of the housing and against the electronic card, wherein the front end of the sliding element is capable of entering or being ejected the setting opening of the portable electronic product to drive the electronic card to be ejected from the portable electronic product through the setting opening or to enter the portable electronic product with the electronic card;

an elastic element connecting the housing and the sliding element, wherein the elastic element is capable of pushing the sliding element by its elasticity to expose the front end of the sliding element outside the housing through the setting opening; and a blocking element provided at the inside of the housing and adjacent to the setting opening, wherein when the front end of the sliding element enters into the portable electronic product through the setting opening, the blocking element pushes the front end of the sliding element to prevent the sliding element from exposing outside the housing because of the elasticity of the elastic element, and when the front end of the sliding element is pressed to release from the blocking element, the elastic element pushes the electronic card to be ejected from the electronic portable product through the setting opening, wherein the sliding element has a bent front end, when the sliding element enters into the portable electronic product, the bent front end is capable of pushing against the blocking element.

2. The fixing device for an electronic card according to claim 1, wherein the sliding element is a rectangle sliding sheet, and two long sides of the sliding sheet have a bent part, respectively.

3. The fixing device for an electronic card according to claim 2, wherein the rectangle sliding sheet has a bent back end, when The electronic card enters into the portable electronic product though the setting opening, the electronic card is capable of contacting with the bent back end of the rectangle sliding sheet and pushes the sliding sheet to enter the portable electronic product along with the electronic card.

4. The fixing device for an electronic card according to claim 1 further comprising a limiting element provided at the inside of the housing for limiting the sliding direction of the sliding element.

5. The fixing device for an electronic card according to claim 4, wherein the limiting element has two guiding plates located at two sides of the sliding element respectively, the guiding plates correspond with bent parts of the sliding element to enable the sliding element to slide between the guiding plates.

6. The fixing device for an electronic card according to claim 5, wherein the limiting element has a restricting plate, when the sliding element slides along the guiding plates, the restricting plate stops the bent part of the sliding element to prevent the sliding element from being eject from the setting opening.

7. The fixing device for an electronic card according to claim 6, wherein the limiting element has two restricting plates which are closer to the setting opening than the guiding plates, and the distance between the two restricting plates is shorter than the distance between the two guiding plates.

8. The fixing device for an electronic card according to claim 1, wherein the housing has an opening for exposing the sliding element, when the sliding element is located at the inside of the housing, the front end of the sliding element is against the blocking element, the sliding element is capable of being downward pressed through the opening to release the front end of the sliding element from the blocking element and be ejected from the setting opening by the elasticity of the elastic element.

9. The fixing device for an electronic card according to claim 1, wherein two ends of the elastic element are fixed on the housing and the sliding element, respectively.

10. The fixing device for an electronic card according to claim 1, wherein the electronic card is a subscriber identification module (SIM) card.

11. The fixing device for an electronic card according to claim 1, wherein the electronic card is a memory card.

12. A portable electronic product comprising:
a circuit board;
a housing;
a fixing device for an electronic card which is provided at the inside of the housing of the portable electronic product and is used for installing and fastening an electronic card in the portable electronic product through a setting opening on the housing or for ejecting the electronic card from the setting opening, wherein the fixing device for an electronic card comprises:
a sliding element which is movably provided at the inside of the housing and pushes against the electronic card, wherein the front end of the sliding element is capable of entering or being ejected the setting opening of the portable electronic product to drive the electronic card to be ejected from the portable electronic product through the setting opening or to enter the portable electronic product with the electronic card;
an elastic element connecting the housing and the sliding element, wherein the elastic element is capable of pushing the sliding element by its elasticity and to expose the front end of sliding element exposed outside the housing through the setting opening; and
a blocking element provided at the inside of the housing and adjacent to the setting opening, wherein when the front end of the sliding element enters into the portable electronic product through the setting opening, the blocking element pushes against the front end of the sliding element to prevent the sliding element from exposing outside the housing because of the elasticity of the elastic element, and when the front end of the sliding element is pressed to release from the blocking element, the elastic element pushes the electronic card to be ejected from the electronic portable product through the setting opening, wherein the rectangle sliding element has a bent front end, when the sliding element enters into the portable electronic product, the bent front end is capable of pushing against the blocking element.

13. The portable electronic product according to claim 12, wherein the sliding element is a rectangle sliding sheet, and two long sides of the sliding sheet have a bent part, respectively.

14. The portable electronic product according to claim 13, wherein the rectangle sliding sheet has a bent back end, when the electronic card enters into the portable electronic product through the setting opening, the electronic card is capable of contacting with the bent back end of the rectangle sliding sheet and pushes the sliding sheet to enter the portable electronic product along with the electronic card.

15. The portable electronic product according to claim 12 further comprising a limiting element provided at the inside of the housing for limiting the sliding direction of the sliding element.

16. The portable electronic product according to claim 15, wherein the limiting element has two guiding plates which are located at two sides of the sliding element respectively, the guiding plates correspond with bent parts of the sliding element to enable the sliding element to slide between the guiding plates.

17. The portable electronic product according to claim 15, wherein the limiting element has a restricting plate, and when the sliding element slides along the guiding plates, the restricting plate stops the bent part of the sliding element to prevent the sliding element from being ejected from the setting opening.

18. The portable electronic product according to claim 17, wherein the limiting element has two restricting plates which is closer to the setting opening than the guiding plates, and the distance between the two restricting plates is shorter than the distance between the two guiding plates.

19. The portable electronic product according to claim 12, wherein the housing has an opening for exposing the sliding element, when the sliding element is located at the inside of the housing, and the front end of the sliding element is against the blocking element, the sliding element is capable of being downward pressed though the opening to release the front end of the sliding element from the blocking element and be ejected from the setting opening by the elasticity of the elastic element.

20. The portable electronic product according to claim 12, wherein two ends of the elastic element are fixed on the housing and the sliding element, respectively.

21. The portable electronic product according to claim 12, wherein the circuit board comprises a plurality of connecting terminals, and the electronic card contacts and electrically connects with the plurality of the connecting terminals on the circuit board.

22. The portable electronic product according to claim 21, wherein when the electronic card enters into the portable electronic product, the electronic card is clamped by the sliding element and the circuit board to fix the electronic card and secure the signal connection between the electronic card and the connection terminals.

23. The portable electronic product according to claim 12, wherein the portable electronic product is a mobile phone.

* * * * *